(12) United States Patent
Bavone

(10) Patent No.: US 6,562,384 B1
(45) Date of Patent: May 13, 2003

(54) UNIFIED FOOD SERVING PRODUCTS HAVING PERSISTENT CRISPY CRUNCHY TEXTURE

(75) Inventor: Joseph M. Bavone, Beloit, WI (US)

(73) Assignee: Kerry Inc., Beloit, WI (US)

( * ) Notice: Subject to any disclaimer, the term of this patent is extended or adjusted under 35 U.S.C. 154(b) by 0 days.

(21) Appl. No.: 09/712,934

(22) Filed: Nov. 16, 2000

Related U.S. Application Data

(62) Division of application No. 09/201,145, filed on Nov. 30, 1998, now Pat. No. 6,194,010.

(51) Int. Cl.⁷ .............................. A23L 1/05; A23L 1/10; A23P 1/08
(52) U.S. Cl. ........................... 426/94; 426/89; 426/100; 426/102; 426/549
(58) Field of Search ........................... 426/89, 102, 94, 426/100, 549

(56) References Cited

U.S. PATENT DOCUMENTS

| | | |
|---|---|---|
| 3,956,515 A | 5/1976 | Moore et al. |
| 4,174,408 A | 11/1979 | Wesselski et al. |
| 4,260,637 A | 4/1981 | Rispoli et al. |
| 4,272,553 A | 6/1981 | Bengtsson et al. |
| 4,282,258 A | 8/1981 | Forkner |
| 4,504,509 A | 3/1985 | Bell et al. |
| 5,431,944 A | 7/1995 | Melvej |
| 5,753,286 A | 5/1998 | Higgins |
| 5,770,252 A | 6/1998 | McEwen et al. |
| 5,897,898 A | 4/1999 | Rogols et al. |
| 5,988,048 A * | 11/1999 | Hunter et al. .................. 99/413 |
| 6,194,010 B1 * | 2/2002 | Bavone ........................ 426/89 |

* cited by examiner

*Primary Examiner*—Helen Pratt
(74) *Attorney, Agent, or Firm*—Birch, Stewart, Kolasch & Birch, LLP

(57) ABSTRACT

Certain coating formulations provide an adhesive effect that enhances points of contact between the individual pieces of food to be joined in deep-fried unified food servings. Batter mixes for restaurant food coating compositions in accordance with the present invention comprise 35%–75% adhesion component, 2%–11% viscosity component, and 5%–50% crispness component. Batter mixes for processor food coating compositions in accordance with the present invention comprise 30%–70% adhesion component, 10%–25% film-forming component, 3%–9% viscosity component, and 8%–40% crispness component. Both compositions may additionally comprise 0.1%–2% leavening component, 0.1%–15% flavoring component, 0.1%–1% coloring component, and/or 0.1%–1% processing aid. Also provided are unified food serving products that are characterized by a persistent crispy, crunchy texture and produced by a process that comprises: providing multiple pieces of a food to be cooked; applying a "back of the house" food coating composition to each piece of food while in a mold; immersing the mold in a heated deep-frying medium to cook the food and join the pieces into a unified food serving reflecting the shape of the mold; and removing the unified food serving product from the deep-frying medium and the mold.

8 Claims, 1 Drawing Sheet

UNIFIED FOOD SERVING PRODUCTS HAVING PERSISTENT CRISPY CRUNCHY TEXTURE

This is a division of U.S. patent application Ser. No. 09/201,145, filed Nov. 30, 1998, now U.S. Pat. No. 6,194,010.

FIELD OF THE INVENTION

This invention is concerned with the cooking of foodstuffs. More particularly, this invention relates to improvements in coating formulations pertaining to the art of deep-frying.

BACKGROUND OF THE INVENTION

In U.S. patent application Ser. No. 09/024,108, filed Feb. 17, 1998, now U.S. Pat. No. 5,988,048, Thomas Hunter and Neil Trager described a process for preparing a unified serving of a coated food. The process described in that application comprises providing multiple pieces of a food to be cooked, coating each piece with an expandable batter, immersing the coated pieces in a mold in a deep-frying medium in order to cook the food, expand the batter, and join the battered pieces into a shaped food product that reflects the shape of the mold, and removing the shaped food product from the deep-frying medium and the mold. The disclosure of said application Ser. No. 09/024,108 is expressly incorporated by reference herein in its entirety.

FIGS. 2 and 3 illustrate a cooking vessel in accordance with the invention of Ser. No. 09/024,108. The cooking vessel of FIG. 2 is made of flat metal. FIG. 3 shows a sectional side view, along line 3—3 of FIG. 2, of the same cooking vessel. As shown in FIG. 3, the cooking vessel takes the form of a basket 40 having a flat-bottomed interior 21, a flat-bottomed exterior 25, a substantially vertical outer wall 22, and an inner ring 42 with substantially vertical walls 23. FIG. 2 shows a perspective view of the same basket 40. In FIG. 2, apertures 41 are visible.

Hunter and Trager recognized in principle that binding together of frozen or defrosted pieces of food into a unitary shaped food product could be facilitated by spraying them with a thin batter or water mist, see page 3, lines 11–20, of Ser. No. 09/024,108. No further information is given in that application regarding the thin batter or water mist. We have now discovered thin batter mist formulations that are particularly well suited for the facilitation of the binding together of frozen or defrosted pieces of food in the context of the preparation of unified servings of deep-fried foodstuffs, both in the "back-of-the-house" or restaurant context and in the context of large scale processor applications.

SUMMARY OF THE INVENTION

The coating formulations of the present invention provide an adhesive effect that enhances points of contact between the individual pieces of food to be joined in deep-fried unified food servings, for instance as described in application Ser. No. 09/024,108. This enhancement promotes the formation of strong bonds upon frying, which enables the food pieces to stay together firmly, both in the cooking mold and afterwards when the unified food serving is removed from the mold, optionally garnished, and served.

The coating formulations of the present invention have the added benefit of improving the eating quality of the coated food pieces, by imparting a crispy, crunchy texture thereto. A further quality of the coating formulations of the present invention is that this crispy, crunchy texture is maintained for extended periods of time when the product is held under a heat lamp.

Batter mixes for back-of-the-house food coating compositions in accordance with the present invention comprise 35%–75% adhesion component, 2%–11% viscosity component, and 5%–50% crispness component. Batter mixes for processor food coating compositions in accordance with the present invention comprise 30%–70% adhesion component, 10%–25% film-forming component, 3%–9% viscosity component, and 8%–40% crispness component. Both compositions may additionally comprise 0.1%–2% leavening component, 0.1%–15% flavoring component, 0.1%–1% coloring component, and/or 0.1%–1% processing aid.

The present invention also provides unified food serving products that are characterized by a persistent crispy, crunchy texture and produced by a process that comprises: providing multiple pieces of a food to be cooked; applying a "back of the house" food coating composition to each piece of food while in a mold; immersing the mold in a heated deep-frying medium to cook the food and join the pieces into a unified food serving reflecting the shape of the mold; and removing the unified food serving product from the deep-frying medium and the mold. Another process according to the present invention provides unified food serving products, characterized by a persistent crispy, crunchy texture, produced by a process comprising: providing multiple pieces of a food to be cooked; applying a "processor" food coating composition to each piece of food; individually freezing each piece of food; adding the frozen pieces of food to a mold; immersing the coated pieces of food in a mold in a heated deep-frying medium to cook the food and join the pieces into a unified food serving reflecting the shape of the mold; and removing the unified food serving product from the deep-frying medium and the mold.

BRIEF DESCRIPTION OF THE DRAWINGS

The invention is described and explained in more detail below using the drawings. The drawings are not necessarily to scale, emphasis instead being placed upon allowing for illustration of principles of the present invention in a clear manner.

DESCRIPTION OF PREFERRED EMBODIMENTS

Figure 1:
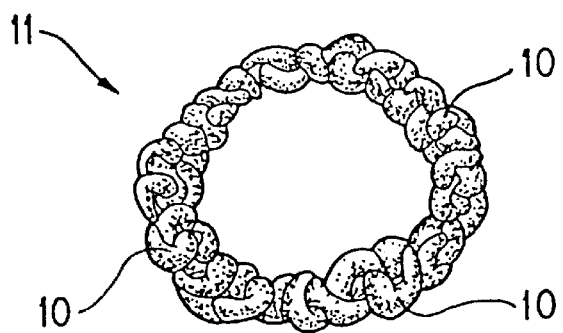
FIG. 1 is a schematic top view of cooked battered shrimp, joined together into a ring in accordance with one embodiment of the present invention.

The coating formulations of the present invention are used in food coating compositions that comprise batter mixes as described herein in admixture with from 1 to 4 parts by weight water. These food coating compositions may be used to prepare unified food serving products that are characterized by a persistent crispy, crunchy texture. The unified food serving products are produced by a process which comprises the steps: a) providing multiple pieces of a food to be cooked; b) applying an aqueous food coating composition to each piece of food; c) immersing the coated pieces of food in a mold in a heated deep-frying medium to cook the food and join the pieces into a unified food serving reflecting the shape of the mold; and d) removing the unified food serving product from the deep-frying medium and the mold, whereupon it is ready to eat.

All of the formulations of the present invention comprise ingredients which provide them with viscosity properties and adhesion properties. These ingredients are instrumental in providing the mechanical effects that enable this invention to work as described. Other ingredients of the present-formulations impact various food aspects of the unified food serving products which are the ultimate goal of the present invention. These include leavening agents, flavoring agents, coloring agents, crispness agents, and so on.

Processor and Back-of-the-house

There are two main ways in which the present invention will normally be implemented, each of which lends itself to different optimum formulations in accordance with the present invention. One may be referred to as a "back-of-the-house" or in-the-restaurant implementation. The other may be referred to as a processor formulation, although processor formulated food is ultimately "finished" in restaurants too.

In implementing a back-of-the-house formulation, a dry batter mix is combined with water by a kitchen employee to form a liquid batter. Pre-breaded food pieces are placed into a ring basket and the liquid batter is poured onto the pieces of food. The fry ring is then placed into a deep-frying bath, which causes the batter to set, holding the food pieces securely together in the shape of the basket.

Batter mixes for back-of-the-house food coating compositions in accordance with the present invention comprise 35%–75% adhesion component, 2%–11% viscosity component, and 5%–50% crispness component. They may additionally comprise 0.1%–2% leavening component, 0.1%–15% flavoring component, 0.1%–1% coloring component, and/or 0.1%–1% processing aid.

Back-of-the-house food coating batter mixes of the present invention typically contain ingredients as follows:

| BACK-OF-THE-HOUSE INGREDIENTS | WEIGHT-% |
|---|---|
| Modified corn starch | 15–44 |
| Maltodextrin 10DE | 12–38 |
| Tapioca dextrin | 6–20 |
| Rice flour | 6–22 |
| Adhesion starch | 5–20 |
| Modified instant corn starch | 2–10 |
| KERRY NATURETONE 5 | 0.0–5.0 |
| KERRY NATURETONE 2608D | 0.0–5.0 |
| KERRY NATURETONE 2608F | 0.0–5.0 |
| Sodium bicarbonate | 0.0–5.0 |
| Caramel coloring | 0.0–5.0 |
| Sodium aluminum phosphate | 0.0–5.0 |
| Xanthan gum | 0.05–0.5 |
| Soybean oil | 0.0–1.0 |

In implementing a processor formulation, individual pieces of food, for instance, mushrooms, cauliflower florettes, cheese curds, are coated with a batter and breading, and the individual coated pieces will then be passed through wet application equipment, for instance, a bath or a sprayer, to apply aqueous coating formulations in accordance with the present invention. The coated individual food pieces are then individually frozen. When the product is purchased by a restaurant, the individual pieces of food are placed into a ring basket and the fry ring is then placed into a deep-frying bath. The heat of the frying medium activates the formulation of the present invention, which sets, holding the food pieces securely together in the shape of the basket.

Batter mixes for processor food coating compositions in accordance with the present invention comprise 30%–70% adhesion component, 10%–25% film-forming component, 3%–9% viscosity component, and 8%–40% crispness component. They may additionally comprise 0.1%–2% leavening component, 0.1%–15% flavoring component, 0.1%–1% coloring component, and/or 0.1%–1% processing aid.

Processor food coating batter mixes of the present invention typically contain ingredients as follows:

| PROCESSOR INGREDIENTS | WEIGHT-% |
|---|---|
| Corn syrup solids | 11–33 |
| Tapioca dextrin | 10–30 |
| Adhesion starch | 10–30 |
| Hi-amylose starch | 8–23 |
| Modified potato starch | 5–15 |
| Rice flour | 4–11 |
| Modified instant corn starch | 3–8 |
| KERRY NATURETONE 5 | 0.0–5.0 |
| KERRY NATURETONE 2608D | 0.0–5.0 |
| KERRY NATURETONE 2608F | 0.0–5.0 |
| Monocalcium phosphate | 0.0–0.5 |
| Sodium bicarbonate | 0.0–0.5 |
| Caramel coloring | 0.0–0.5 |
| Xanthan gum | 0.05–0.5 |
| Soybean oil | 0.0–1.0 |

Adhesion

An important feature of the present invention is the adhesion component. Any edible substance that provides tackiness, or adhesive qualities, to a degree sufficient to substantially enhance adhesion between points of contact on the coated appetizer pieces can be used as the adhesion component. It has been found that tapioca dextrin, maltodextrin, adhesion starch (e.g., BATTER BIND from National Starch & Chemical), and corn syrup solids, used alone or in combination, are particularly suitable for use as the adhesion component in the present invention. Tapioca dextrin provides good results in all environments. When one is frying food in the frozen state, the high degree of tackiness provided by corn syrup solids is particularly useful.

Viscosity

The coating of the present invention must have sufficient viscosity to enable the batter to form contact points between areas of coated food pieces that are very close together but not actually touching. It has been found that modified instant corn starch and xanthan gum, used alone or in combination, are particularly suitable for use as the viscosity component in the present invention.

Leavening

The formation of contact points between coated food pieces is also enhanced by herein by the use of a leavening component. The leavening component raises areas of the coated surfaces of individual pieces of food to increase the number of potential contact points. It has been found that monocalcium phosphate and sodium bicarbonate are suitable for use as the leavening component in the present invention when it is desired to achieve a faster reaction time, which allows contact points to form quickly. For increased batter stability, however, it has been found that sodium bicarbonate and sodium aluminum phosphate are more suitable for use as the leavening component in the present invention.

Film-Formation

In order to promote the formation of a more uniform coating over the whole surface area of the coated product, one may use a film-forming component in the coating of this invention. It has been found that high amylose starch is particularly suitable for use as a film-forming component in the present invention. Film-formation ingredients are typically included in processor formulations.

Crispness

It is generally desirable that the coating formulation of the present invention contribute crispness to the unified food serving. It has been found that modified potato starch and rice flour, used alone or in combination, are particularly suitable for use as a crispness component in the present invention. The crispness component may also enhance heat lamp stability of the unified food serving, thus facilitating use of the process in settings in which there is some delay between the completion of cooking and actual service of the unified food serving.

Flavoring and Coloring

Gustatory and/or visual aspects of the unified food serving may be enhanced by incorporating flavoring and/or coloring components in the coating formulation of the present invention. Suitable flavoring agents include natural and artificial flavors and mixtures thereof. It has been found that the natural flavoring agents designated as KERRY NATURETONES 5 (a natural dairy flavor), KERRY NATURETONES 2608D (a natural sherry flavor), and KERRY NATURETONES 2608F (a natural sauterne flavor), used alone or in combination, are particularly suitable for use as a flavoring component when it is desired to counter a starchy taste in the present invention. In some cases, it is desirable to add other flavors, alone or in conjunction with spices, seasonings, and other flavoring components, to the coating formulations of the present invention, in order to create a shared appetizer with specific flavor profiles. It has been found that caramel color is particularly suitable for use as a coloring component in the present invention.

Processing Aid

Dusting in the manufacture of the coating of this invention can be reduced by incorporating into the formulation a component such as soybean oil.

EXAMPLES

The following Examples illustrate various specific applications of the present invention. However, these Examples are presented only by way of explanation. Based upon the generic teachings throughout this specification, those skilled in the art will be able to implement the present invention in a wide variety of other specific applications.

Example 1

"Back of House" Formulation (Shrimp)

A CLEARSTICK batter mixture is prepared having the indicated percentages by weight of the indicated ingredients:

| INGREDIENT | FUNCTION | WEIGHT-% |
|---|---|---|
| Modified corn starch | adhesion | 29.00 |
| Maltodextrin 10DE | adhesion | 24.75 |
| Tapioca dextrin | adhesion | 12.00 |
| Rice flour | crispness | 11.85 |
| Adhesion starch | adhesion | 11.25 |
| Modified instant corn starch | viscosity | 05.00 |
| KERRY NATURETONE 5 | flavoring | 02.00 |
| KERRY NATURETONE 2608D | flavoring | 01.50 |
| KERRY NATURETONE 2608F | flavoring | 01.50 |
| Sodium bicarbonate | leavening | 00.25 |
| Caramel coloring | coloring | 00.25 |

-continued

| INGREDIENT | FUNCTION | WEIGHT-% |
|---|---|---|
| Sodium aluminum phosphate | leavening | 00.25 |
| Xanthan gum | viscosity | 00.20 |
| Soybean oil | processing aid | 00.20 |

One part dry CLEARSTICK batter mix was combined with 2 parts water to form a liquid coating batter in accordance with the present invention. Clean raw peeled shrimp were battered and breaded and arranged in a layer approximately three deep around the bottom of the ring-shaped mold basket illustrated in FIGS. 2 and 3 and described in detail in U.S. patent application Ser. No. 09/024,108. Liquid coating batter prepared as described herein above was poured onto the breaded shrimp arrangement so as to coat substantially each piece of shrimp. The basket containing the coated battered shrimp was then deep-fried in oil, to produce a unified serving of coated shrimp, securely joined together in the form of a ring, as illustrated in FIG. 1. In FIG. 1, individual shrimp 10 are joined together to form a ring 11.

Example 2

"Back of House" Formulation (Chicken)

A CLEARSTICK batter mixture is prepared having the indicated percentages by weight of the indicated ingredients:

| INGREDIENT | FUNCTION | WEIGHT-% |
|---|---|---|
| Modified corn starch | adhesion | 33.60 |
| Maltodextrin 10DE | adhesion | 24.75 |
| Tapioca dextrin | adhesion | 12.00 |
| Rice flour | crispness | 11.85 |
| Adhesion starch | adhesion | 11.00 |
| Modified instant corn starch | viscosity | 03.00 |
| KERRY NATURETONE 2608F | flavoring | 03.00 |
| Caramel coloring | coloring | 00.40 |
| Xanthan gum | viscosity | 00.25 |
| Soybean oil | processing aid | 00.15 |

One part dry CLEARSTICK mix was combined with 2 parts water to form a liquid coating batter in accordance with the present invention. Clean raw chicken wing segments were breaded with a flour breader and partially fried in oil. The par-fried chicken wing segments were arranged in the ring-shaped mold basket illustrated in FIGS. 2 and 3 and described in detail in U.S. patent application Ser. No. 09/024,108. Liquid coating batter prepared as described herein above was poured onto the breaded chicken wing arrangement so as to substantially coat each chicken wing segment. The basket containing the coated battered chicken wing segments was then deep-fried in oil, to produce a unified serving of coated chicken wing segments, securely joined together in the form of a ring.

Example 3

"Processor" Formulation (Mushrooms)

A CLEARSTICK batter mixture is prepared having the indicated percentages by weight of the indicated ingredients:

| INGREDIENT | FUNCTION | WEIGHT-% |
|---|---|---|
| Corn syrup solids | adhesion | 22.09 |
| Tapioca dextrin | adhesion | 20.00 |

-continued

| INGREDIENT | FUNCTION | WEIGHT-% |
|---|---|---|
| Adhesion starch | adhesion | 20.00 |
| Hi-amylose starch | film-forming | 15.00 |
| Modified potato starch | crispness | 10.00 |
| Rice flour | crispness | 07.00 |
| Modified instant corn starch | viscosity | 05.00 |
| Monocalcium phosphate | leavening | 00.31 |
| Sodium bicarbonate | leavening | 00.25 |
| Caramel coloring | coloring | 00.20 |
| Xanthan gum | viscosity | 00.15 |

One part dry CLEARSTICK batter mix was combined with two parts water to form a liquid coating batter in accordance with the present invention. Clean mushrooms were breaded with a conventional breading system. The breaded mushrooms were passed through a bath of liquid coating batter prepared as described above, substantially coating each mushroom. The coated battered mushrooms were then individually frozen.

Figure 2:
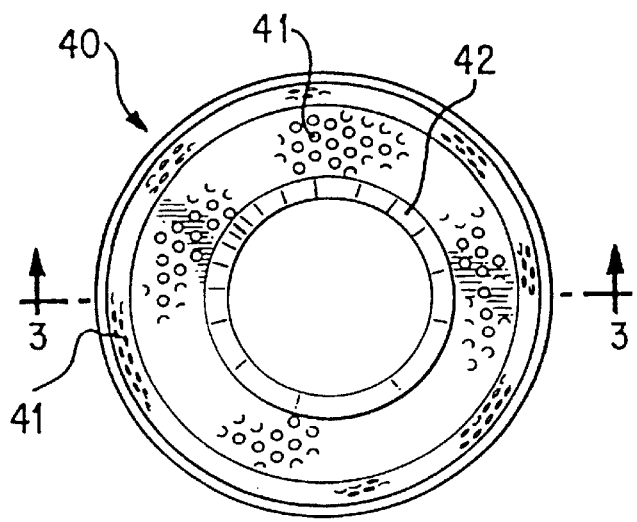
FIG. 2 is a top perspective view of a basket that may be used in accordance with the present invention.
Figure 3:
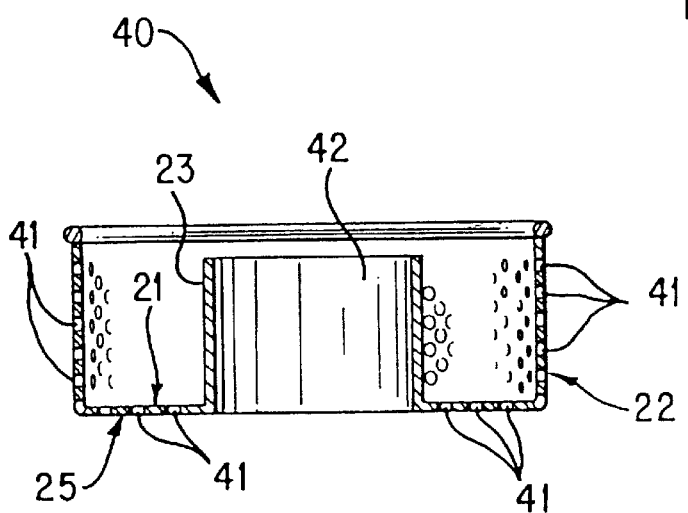
FIG. 3 is a sectional side view of a basket that may be used in accordance with the present invention, along line 3—3 of FIG. 2.

When ready for use, the frozen coated battered mushrooms were arranged in a layer approximately three deep around the bottom of the ring-shaped mold basket illustrated in FIGS. 2 and 3 and described in U.S. patent application Ser. No. 09/024,108. The basket containing the frozen coated battered mushrooms was then deep-fried in oil, to produce a unified breaded mushroom appetizer, securely joined together in the form of a ring.

Example 4
"Processor" Formulation (Cheese Curds)

A CLEARSTICK batter mixture is prepared having the indicated percentages by weight of the indicated ingredients:

| INGREDIENT | FUNCTION | WEIGHT-% |
|---|---|---|
| Corn syrup solids | adhesion | 28.0 |
| Tapioca dextrin | adhesion | 21.5 |
| Adhesion starch | adhesion | 12.0 |
| Hi-amylose starch | film-forming | 12.0 |
| Modified potato starch | crispness | 10.0 |
| Rice flour | crispness | 08.0 |
| Modified instant corn starch | viscosity | 06.0 |
| Monocalcium phosphate | leavening | 00.5 |
| Sodium bicarbonate | leavening | 00.5 |
| Caramel coloring | coloring | 00.5 |
| Xanthan gum | viscosity | 00.5 |
| Soybean oil | processing aid | 00.5 |

One part dry CLEARSTICK batter mix was combined with two parts water to form a liquid coating batter in accordance with the present invention. Cheese curds were breaded with a conventional breading system. The breaded cheese curds were passed through a spray of liquid coating batter prepared as described above, substantially coating all of the cheese curds. The coated battered cheese curds were then individually frozen.

When ready for use, the frozen coated battered cheese curds were arranged in a layer approximately two inches deep around the bottom of the ring-shaped mold basket illustrated in FIGS. 2 and 3 and described in U.S. patent application Ser. No. 09/024,108. The basket containing the frozen coated battered cheese curds was then deep-fried in oil, to produce a unified breaded cheese curd appetizer, securely joined together in the form of a ring.

While there have been described and illustrated various specific embodiments of the invention, it will be clear that variations in the details of the embodiments specifically illustrated and described may be made without departing from the true spirit and scope of the invention as defined in the appended claims.

What is claimed is:

1. A unified food serving product which is characterized by a persistent crispy, crunchy texture, wherein said unified food serving product is prepared by a process comprising the steps of:
    a) providing a mold and multiple pieces of a pre-breaded food to be cooked;
    b) applying a food coating composition, said food coating composition comprising a batter mix for a back-of-the house food coating composition comprising 35%–75% adhesion component, 2%–11% viscosity component, and 5%–50% crispness component in admixture with from 1 to 4 parts by weight water, to each said piece of food while in the mold;
    c) immersing the mold in a heated deep-frying medium to cook the food and join the pieces into a unified food serving reflecting the shape of the mold; and
    d) removing the unified food serving product from the deep-frying medium and the mold.

2. The unified food serving product of claim 1, wherein the batter mix comprises
    35%–75% adhesion component selected from the group consisting of tapioca dextrin, maltodextrin, adhesion starch, and corn syrup solids,
    a viscosity component comprising 2%–10% modified instant corn starch with 0.05%–0.5% xanthan gum,
    5%–50% crispness component selected from the group consisting of modified potato starch and rice flour, and optionally
    0.1%–2% leavening component, 0.1%–15% flavoring component, 0.1%–1% coloring component, and/or 0.1%–1% oil.

3. The unified food serving product of claim 1, wherein said batter mix comprises:

| INGREDIENT | WEIGHT-% |
|---|---|
| Modified corn starch | 15–44 |
| Maltodextrin 10DE | 12–38 |
| Tapioca dextrin | 6–20 |
| Rice flour | 6–22 |
| Adhesion starch | 5–20 |
| Modified instant corn starch | 2–10 |
| Dairy flavor | 0.0–5 |
| Sherry flavor | 0.0–5 |
| Sauterne flavor | 0.0–5 |
| Sodium bicarbonate | 0.0–0.5 |
| Caramel coloring | 0.0–0.5 |
| Sodium aluminum phosphate | 0.0–0.5 |
| Xanthan gum | 0.05–0.5 |
| Soybean oil | 0.0–1.0 |

4. The unified food serving product of claim 1, wherein said food is selected from the group consisting of shrimp, chicken, mushrooms, and cheese curds.

5. A unified food serving product which is characterized by a persistent crispy, crunchy texture, wherein said unified food serving product is prepared by a process comprising the steps of:
    a) providing a mold and multiple pieces of a battered, breaded food to be cooked;
    b) applying a food coating composition, said food coating composition comprising a batter mix for a processor food coating comprising 30%–70% adhesion component, 10%–25% film-forming component, 3%–9% viscosity component, and 8%–40% crispness component in admixture with from 1 to 4 parts by weight water, to each said piece of food;

c) individually freezing each piece of food;

d) adding the frozen pieces of food to the mold;

e) immersing the coated pieces of food in a mold in a heated deep-frying medium to cook the food and join the pieces into a unified food serving reflecting the shape of the mold; and f) removing the unified food serving product from the deep-frying medium and the mold.

6. The unified food serving product of claim 5, where said food coating composition comprises 30%–70% adhesion component selected from the group consisting of tapioca dextrin, maltodextrin, adhesion starch, and corn syrup solids, 10%–25% high amylose starch film-forming component, a viscosity component comprising 3%–8% modified instant corn starch with 0.05%–0.5% xanthan gum, 8%–40% crispness component selected from the group consisting of modified potato starch and rice flour, and optionally 0.1%–2% leavening component, 0.1%–15% flavoring component, 0.1%–1% coloring component, and/or 0.1%–1% oil.

7. The unified food serving product of claim 5, wherein said batter comprises:

| INGREDIENT | WEIGHT-% |
|---|---|
| Corn syrup solids | 11–33 |
| Tapioca dextrin | 10–30 |
| Adhesion starch | 10–30 |
| Hi-amylose starch | 8–23 |
| Modified potato starch | 5–15 |
| Rice flour | 4–11 |
| Modified instant corn starch | 3–8 |
| Dairy flavor | 0.0–5 |
| Sherry flavor | 0.0–5 |
| Sauterne flavor | 0.0–5 |
| Monocalcium phosphate | 0.0–0.5 |
| Sodium bicarbonate | 0.0–0.5 |
| Caramel coloring | 0.0–0.5 |
| Xanthan gum | 0.05–0.5. |

8. The unified food serving product of claim 5, wherein said food is selected from the group consisting of shrimp, chicken, mushrooms, and cheese curds.

* * * * *